United States Patent [19]

Sitzberger et al.

[11] Patent Number: 5,795,232

[45] Date of Patent: Aug. 18, 1998

[54] DRIVE ASSEMBLY COUPLER

[75] Inventors: Carl R. Sitzberger, St. Peters, Mo.; Richard L. Hudson, Tulsa; Thomas W. Boyer, Collinsville, both of Okla.

[73] Assignee: R. L. Hudson & Company, Tulsa, Okla.

[21] Appl. No.: 816,658

[22] Filed: Mar. 13, 1997

[51] Int. Cl.$^6$ ........................................ F16D 3/68
[52] U.S. Cl. .......................... 464/73; 464/81; 464/87
[58] Field of Search ............................ 464/73, 85, 87, 464/88, 92, 93

[56] References Cited

U.S. PATENT DOCUMENTS

| | | |
|---|---|---|
| 1,716,963 | 6/1929 | Johnston . |
| 1,802,342 | 4/1931 | Froussard . |
| 2,502,790 | 4/1950 | Jencick .................. 464/73 |
| 2,587,819 | 3/1952 | Camerino .............. 464/73 |
| 2,899,808 | 8/1959 | Berens .................. 464/73 |
| 2,951,354 | 9/1960 | Anderson .............. 464/73 |
| 3,363,435 | 1/1968 | Crow ..................... 464/73 |
| 3,499,299 | 3/1970 | Hector ................... 464/81 |
| 3,828,368 | 8/1974 | Cocherell et al. ..... 464/87 |
| 3,872,691 | 3/1975 | Hildebrandt ........... 464/87 |
| 3,873,863 | 3/1975 | Pew ....................... 310/50 |
| 3,902,333 | 9/1975 | Dossier ................. 464/73 |
| 4,385,896 | 5/1983 | Borda ................... 464/73 |
| 4,407,602 | 10/1983 | Terry, Jr. .............. 403/336 |
| 4,860,278 | 8/1989 | Nakahara .............. 369/271 |
| 4,931,678 | 6/1990 | Lutz ..................... 310/62 |
| 5,215,503 | 6/1993 | Krouse et al. ........ 474/153 |
| 5,357,179 | 10/1994 | Abbagnaro et al. .. 318/17 |

Primary Examiner—Eileen A. Dunn
Attorney, Agent, or Firm—Head, Johnson & Kachigian

[57] ABSTRACT

A drive assembly coupler to transfer torque from a motor shaft. The coupler includes a body having a first end, a second opposed end, and an axial opening through the body extending between the ends. A first pair of opposed channels is provided in the body, each channel parallel to the other and parallel to the opening. A second pair of opposed channels is provided in the body, each channel parallel to the other and parallel to the opening. A first U-shaped insert has a threaded opening receivable in the first end and has a first pair of extending legs receivable in the first channels. A second U-shaped insert has a threaded opening receivable in the second end and has a second pair of extending legs receivable in the second channels.

13 Claims, 3 Drawing Sheets

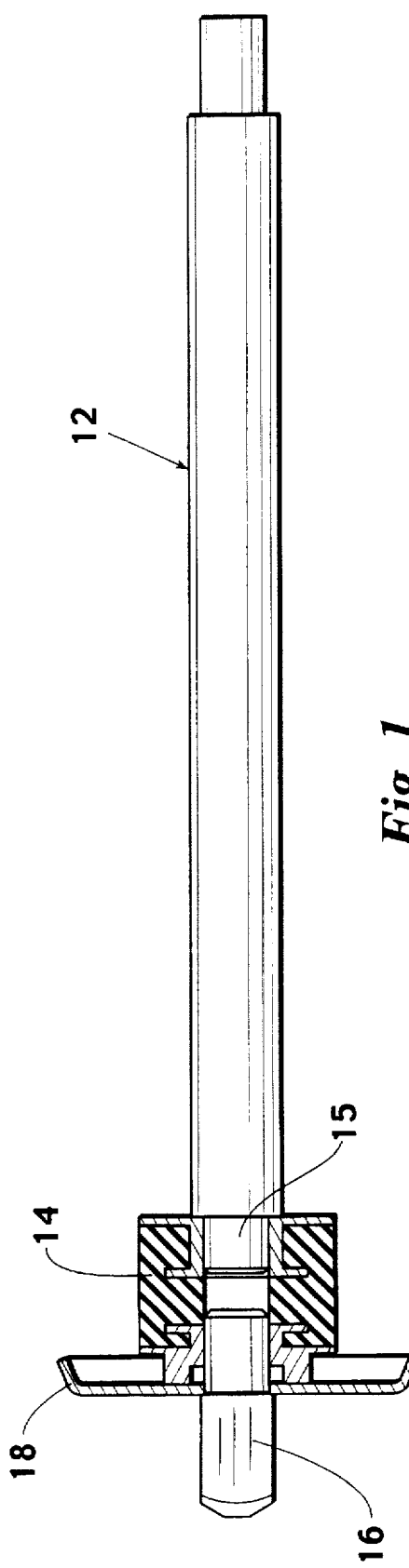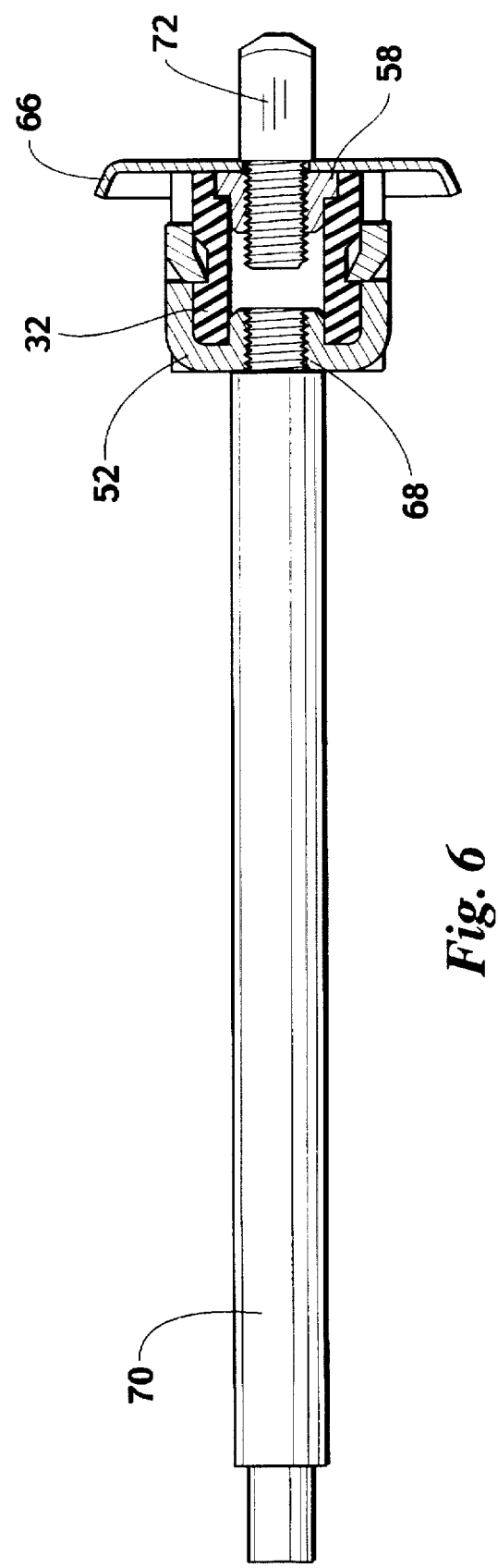
*Fig. 1* (PRIOR ART)
*Fig. 6*

DRIVE ASSEMBLY COUPLER

BACKGROUND OF THE INVENTION

1. Field of the Invention.

The present invention is directed to a coupler assembly to transfer torque from a motor shaft. More particularly, the present invention is directed to a coupler assembly providing an electrical insulating barrier between an electric motor shaft and a drive mechanism.

2. Prior Art.

Various types of appliances and other devices utilizing electric motors employ coupler assemblies to transfer torque from a motor shaft to a drive mechanism. An example would be electric motors used in household appliances to power blades in a blender or to power attachments used on food processors or to power grinding blades on a coffee grinder. Space restrictions within the appliance require a small coupler assembly.

In each of these instances, insulation must be provided between the electric motor and the mixing or other attachment to avoid the possibility of shock. Indeed, engineering requirements have been established such as IEC 335-1; IEC 335-14; BS 3456 Part 1 and Part 2 Sec. 2.28; CEE 10 Part 1, Part II G/A.

Many current production couplers utilize thermoset rubber as the insulating material. These often use carbon black which must be formulated and blended in the proper manner in order not to conduct electricity. It has been found assemblers must inspect 100% of the couplers for possible failure.

Other existing couplers use an air gap for insulating between the motor and the drive mechanism. These couplers often all require inspection of the couplers.

In summary, past couplers have been difficult to manufacture and labor intensive.

Past attempts at manufacturing a coupling exclusively from molded plastic have resulted in threaded openings that strip fail under operating conditions.

Examples of other insulator couplings are shown in Johnston (U.S. Pat. No. 1,716,963) which provides an insulator coupling having a plurality of extending spider-like legs receivable in a ceramic disk and Frusard (U.S. Pat. No. 1,802,342) which provides a shaft coupling to electrically insulate one section of the shaft from another.

There is a need for a non-conducting coupler that will be simple to fabricate from inexpensive materials.

It is, therefore, a principal object and purpose of the present invention to protide an insulated coupling that may be fabricated from a plastic or other non-conducting body and a pair of metal stamped inserts that may be fabricated from flat metal.

It is an additional object and purpose of the present invention to provide an insulated coupling that will provide an air space between the motor shaft and drive assembly for insulation.

It is an additional object and purpose of the present invention to provide an insulated coupling capable of retrofitting with current household appliances.

It is a further object and purpose of the present invention to provide an insulated coupling that eliminates the need for traditional fasteners.

It is a further object and purpose of the present invention to provide an insulated coupling that is symmetrical so that it can not be installed incorrectly.

BRIEF DESCRIPTION OF THE DRAWINGS

FIG. 1 shows a perspective view of a prior art coupler along with a motor shaft and drive lug;

FIG. 6 illustrates a cross-sectional view of the coupler shown in FIG. 4 engaged with a motor shaft and drive lug.

SUMMARY OF THE INVENTION

The present invention provides a drive assembly coupler in order to transfer torque or rotational movement from a motor shaft to a drive assembly which may include a drive lug.

The coupler includes an elongated body which is fabricated from a non-electrical conducting material. The body has a central longitudinal axial opening through the entire length of the body. The body includes a first pair of channels which are opposed to each other and parallel to the axial opening. Each channel includes a recess therein. The first pair of channels, thus, provides a reduced portion in the diameter of the body.

A second pair of channels are opposed to each other and parallel to the axial opening. The second pair of channels, thus, provides a reduced portion in the diameter of the body. Each of the second channels also includes a recess.

A first insert includes a threaded opening and a pair of extending legs. A second insert includes a threaded opening and a second pair of extending legs.

The first insert is receivable on the body by engagement of the extending legs in the first channels. The second insert is engagable with the body by engagement of the extending legs in the second channels.

Each leg terminates in a protrusion receivable in a recess in one of the channels.

DETAILED DESCRIPTION OF THE PREFERRED EMBODIMENTS

Figure 2:
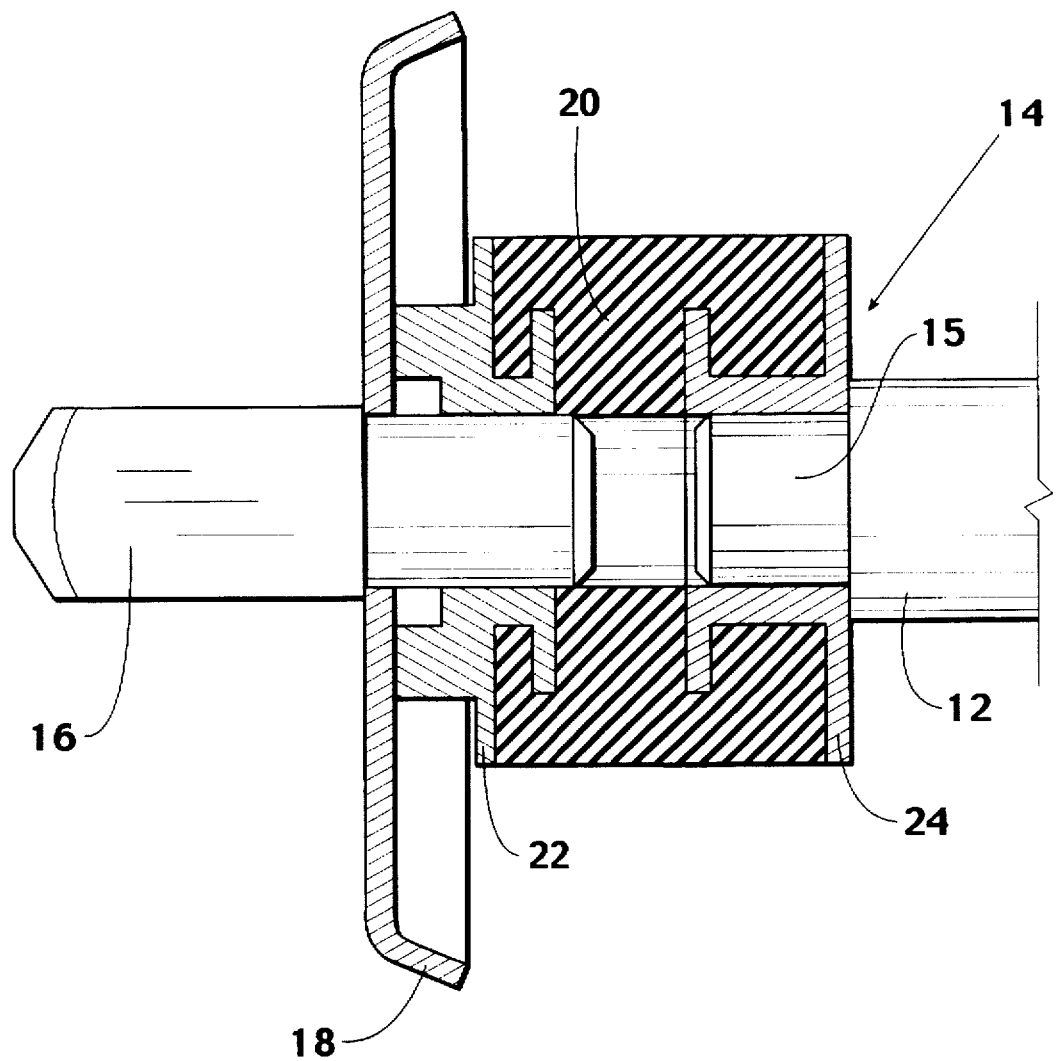
FIG. 2 shows the prior art coupler shown in FIG. 1 in an enlarged format.

Referring to the drawings in detail, FIGS. 1 and 2 illustrate an example of an existing prior art coupler. In the example shown, the coupler 14 would be utilized for an electrical motor shaft for a household appliance such as a blender. Other uses of the coupler are, of course, well within the confines of the invention.

A motor shaft 12 would be connected to an electric motor (not shown) within the interior of the appliance. One end 15 of the motor shaft terminates in an externally threaded portion. The threaded shaft end 15 is received on a coupler 14. The coupler, in turn, is threadably connected to a drive lug 16 which will be connected to a blade or other attachment. The coupler 14 and motor shaft 12 are normally internal to the appliance while the drive lug extends externally. In some applications, a spill shield 18 would be utilized to prevent liquids or other materials from entering into the motor of the appliance.

FIG. 2 illustrates an enlarged view of the prior art coupler 14. The coupler includes a metal inserted thermoset rubber body 20 which is molded onto a hub. The hub is then drilled and tapped to create an air space and to remove any conducting metal between the threaded ends 22 and 24.

FIGS. 3, 4, 5 and 6 illustrate the drive assembly coupler 30 of the present invention.

Figure 3:
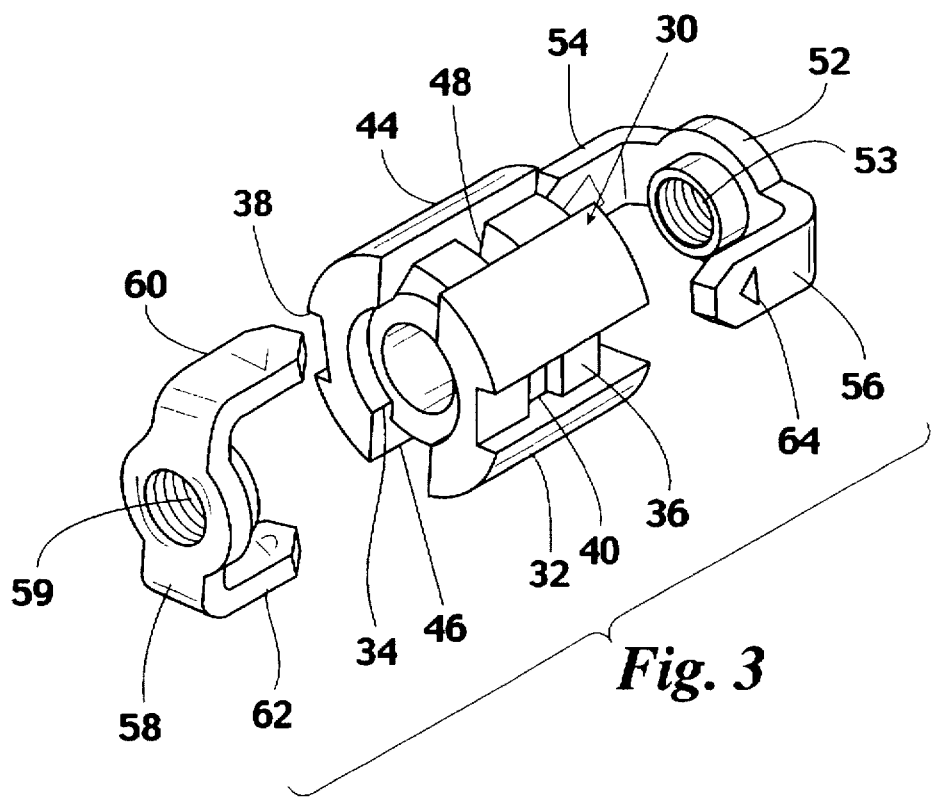
FIG. 3 illustrates an exploded view of a drive assembly coupler constructed in accordance with the present invention.

FIG. 3 illustrates an exploded, assembly view of the coupler 30. The coupler 30 includes an elongated body 32. The body is fabricated from a non-conducting material such as a rigid thermoplastic. The body might alternately be fabricated from a thermoplastic elastomer (TPE), a thermoplastic urethane (TPU) or other non-conducting material.

Figures 4, 5:
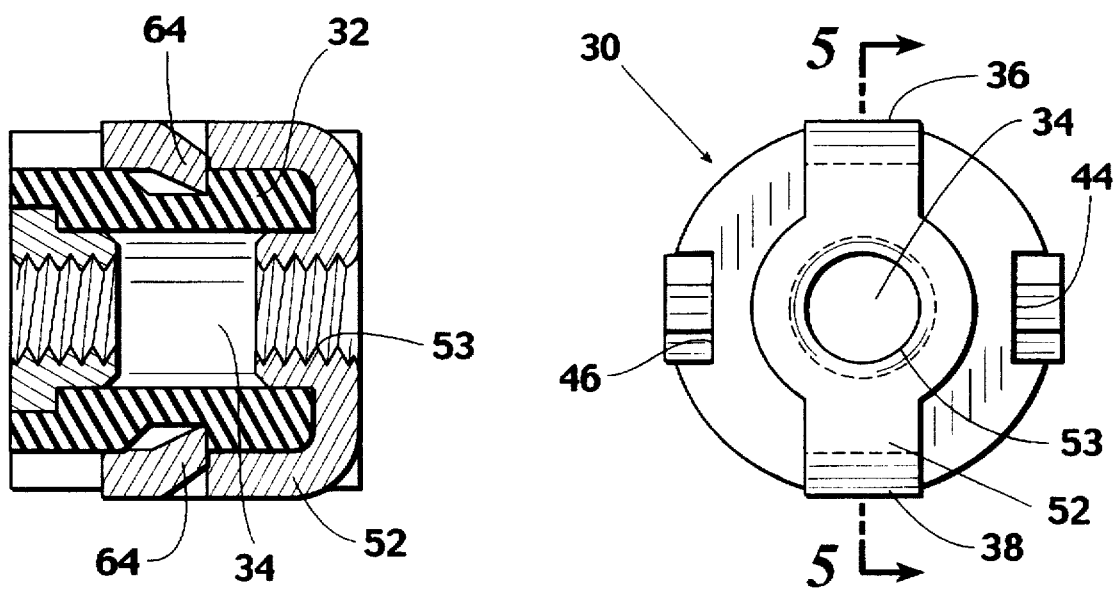
FIG. 4 illustrates a drive assembly coupler in assembled condition.
FIG. 5 illustrates a cross-sectional view of the coupler shown in FIG. 4.

The body 32 has a central longitudinal axial opening 34 through the entire length of the body as best seen in the top view in FIG. 4. The opening, thus, extends through the entire body from one end to the other end. The diameter of the opening 34 is slightly larger than the diameter of the threaded motor shaft end previously described.

The body 32 also includes a first pair of channels 36 and 38 which are opposed to each other and parallel to the axial opening 34. The channels, thus, provide a reduced portion in the diameter of the body. Each channel 36 and 38 includes a recess 40 and 42, respectively (recess 42 not visible in FIG. 3).

A second pair of channels 44 and 46 are opposed to each other and parallel to the axial opening 34. The channels 44 and 46, thus, provide a reduced portion in the diameter of the body 32. Each channel 44 and 46 includes a recess 48 and 50, respectively (50, not visible in FIG. 3).

A first U-shaped insert 52 includes a threaded opening 53 which is receivable in the first end of the body. The insert 52 also includes a first pair of extending legs 54 and 56.

A second U-shaped insert 58 has a threaded opening 59 receivable in the second end of the body. The second insert 58 includes a second pair of extending legs 60 and 62.

The first insert 52 is identical with the second insert 58.

The first U-shaped insert is receivable on the body 32 by engagement of the legs 54 and 56 in the channels 38 and 36, respectively. The channels 36 and 38 are only slightly wider than the width of the legs so that any rotational movement is prevented. The second U-shaped insert 58 is engageable with the body by receiving the second pair of extending legs in the channels 44 and 46. The channels 44 and 46 are only slightly wider than the width of the legs so that any rotational movement is prevented.

FIG. 4 shows a top view illustrating the orientation of the first insert 52 with the body 32 and the second insert 58. The inserts are fabricated and stamped from a flat metal sheet.

With continuing reference to FIG. 3 and to the cross-sectional view in FIG. 5, each leg 54, 56, 60 and 62 terminates in a protrusion 64 which extends inward toward the threaded opening. Each protrusion 64 is receivable in a recess or undercut in each of the channels. By way of example, leg 56 of insert 52 terminates in protrusion 64 receivable in recess 40. The protrusions 64 may be formed by a metal stamp pierce process.

Each leg 54, 56, 60 and 62 is slightly resilient with a spring force so that each leg and protrusion will slide in and over its channel until the protrusion resides in the recess.

This can also be accomplished by slightly flaring each leg outward radially, then leg 54, 56, 60 and 62 would be crimped or pressed back to a vertical position in the channel so as to engage the protrusion 64 with the receivable recess 40.

The engagement of the protrusions 64 in the recesses prevents axial movement of the inserts 52 and 58 from the body 32.

FIG. 6 illustrates a perspective view of a motor shaft and drive lug connected with the coupler 30. A spill shield 66 separates the interior from the exterior of the appliance. A threaded end 68 of motor shaft 70 is rotated by an electric motor (not shown) of an appliance. The rotational movement of the motor shaft 70 is transferred to the insert 52. Rotational movement of the insert 52 is, in turn, translated to rotational movement of the body 32 of the coupler 30. In turn, rotation of the body 32 is translated into rotation of the second insert 58. Finally, rotation of the second insert 58 is translated into rotation of the drive lug 72. It can be seen that an air space exists between the end 68 of the motor shaft and the drive lug.

Whereas, the present invention has been described in relation to the drawings attached hereto, it should be understood that other and further modifications, apart from those shown or suggested herein, may be made within the spirit and scope of this invention.

What is claimed is:

1. A drive assembly coupler to transfer torque from a motor shaft, which coupler comprises:

a non-conducting body having a longitudinal axial opening therethrough, said body having a first pair of channels opposed to each other and parallel to said axial opening, and having a second pair of channels opposed to each other and parallel to said longitudinal opening; and a pair of inserts, each insert having a projection with a threaded cylindrical opening, said projection receivable within said axial opening and a pair of legs extending parallel to said threaded opening, said legs receivable in said channels.

2. A drive assembly coupler as set forth in claim 1 wherein each said leg includes a protrusion near the end thereof receivable in a recess in each one of said channels.

3. A drive assembly coupler as set forth in claim 1 wherein said body is fabricated from plastic.

4. A drive assembly coupler as set forth in claim 1 wherein each said leg is resilient.

5. A drive assembly coupler as set forth in claim 1 wherein one said insert receives a threaded end of said motor shaft and the other insert receives a threaded drive lug.

6. A drive assembly coupler as set forth in claim 1 wherein said leg pairs are oriented 90° radially from each other.

7. A drive assembly coupler to transfer torque from a motor shaft, which coupler comprises:

a body having a first end, a second opposed end, and an axial opening through said body extending between said ends;

a first pair of opposed channels in said body, each first channel parallel to each other and parallel to the opening;

a second pair of opposed channels in said body, each second channel parallel to each other and parallel to the opening;

a first U-shaped insert, said first insert having a projection with a threaded cylindrical opening, said projection receivable in said first end and having a first pair of extending legs receivable in said first channels; and a second U-shaped insert, said second insert having a projection with a threaded cylindrical opening, said projection receivable in said second end and having a second pair of extending legs receivable in said second channels.

8. A drive assembly coupler as set forth in claim 7 wherein each said leg includes a protrusion near the end thereof receivable in a recess in each one said channel.

9. A drive assembly coupler as set forth in claim 7 wherein said first pair of legs are rotated 90° radially from said second pair of legs.

10. A drive assembly coupler as set forth in claim 7 wherein said body is fabricated from plastic and each said insert is stamped from a flat metal sheet.

11. A method to transfer torque from a motor shaft to a drive assembly, which method comprises:

forming a body having a longitudinal axial opening therethrough from a non-conducting material, said body having a first pair of channels opposed to each other and parallel to said opening and having a second pair of channels opposed to each other and parallel to said opening;

engaging a first U-shaped insert with said body by engaging a first pair of legs on said insert with said first channels and receiving a projection having a threaded cylindrical opening on said first insert in said body opening;

engaging a second U-shaped insert with said body by engaging a second pair of legs on said insert with said second channels and receiving a projection having a threaded cylindrical opening on said first insert in said body opening; and connecting said motor shaft to said first insert and connecting said drive assembly to said second insert.

12. A method to transfer torque from a motor shaft as set forth in claim 11 including the additional step of stamping a pierce in each said leg to form a protrusion receivable in recesses in said channels.

13. A method to transfer torque from a motor shaft as set forth in claim 11 including the additional steps of stamping said first insert from a flat metal sheet and stamping said second insert from a flat metal sheet.

* * * * *